United States Patent [19]
Katsumata

[11] Patent Number: 5,479,467
[45] Date of Patent: Dec. 26, 1995

[54] HISTORY RECORDING APPARATUS

[75] Inventor: Akio Katsumata, Mishima, Japan

[73] Assignee: Kabushiki Kaisha Tec, Shizuoka, Japan

[21] Appl. No.: 232,955

[22] Filed: Apr. 25, 1994

[30] Foreign Application Priority Data

Apr. 28, 1993 [JP] Japan .................. 5-103243

[51] Int. Cl.⁶ .................................. G06M 3/00
[52] U.S. Cl. ............................ 377/26; 377/15
[58] Field of Search ........................... 377/15, 26

[56] References Cited

U.S. PATENT DOCUMENTS 5,276,461  1/1994  Saito ........................... 346/107

FOREIGN PATENT DOCUMENTS 0288990  11/1989  Japan ........................... 377/26

Primary Examiner—Margaret Rose Wambach
Attorney, Agent, or Firm—Frishauf, Holtz, Goodman, Langer & Chick

[57] ABSTRACT

A history recording apparatus comprises an EEPROM for storing operation history data regarding a predetermined operation performed by a label printer, and an IC socket provided on a circuit board of the label printer and detachably connectable to the EEPROM. In particular, the history recording apparatus further comprises a CPU for updating the operation history data stored in the nonvolatile memory connected to the IC socket, upon detection of the predetermined operation having been performed a preset number of times which is determined on the basis of a writing tolerance limit of the EEPROM.

7 Claims, 8 Drawing Sheets

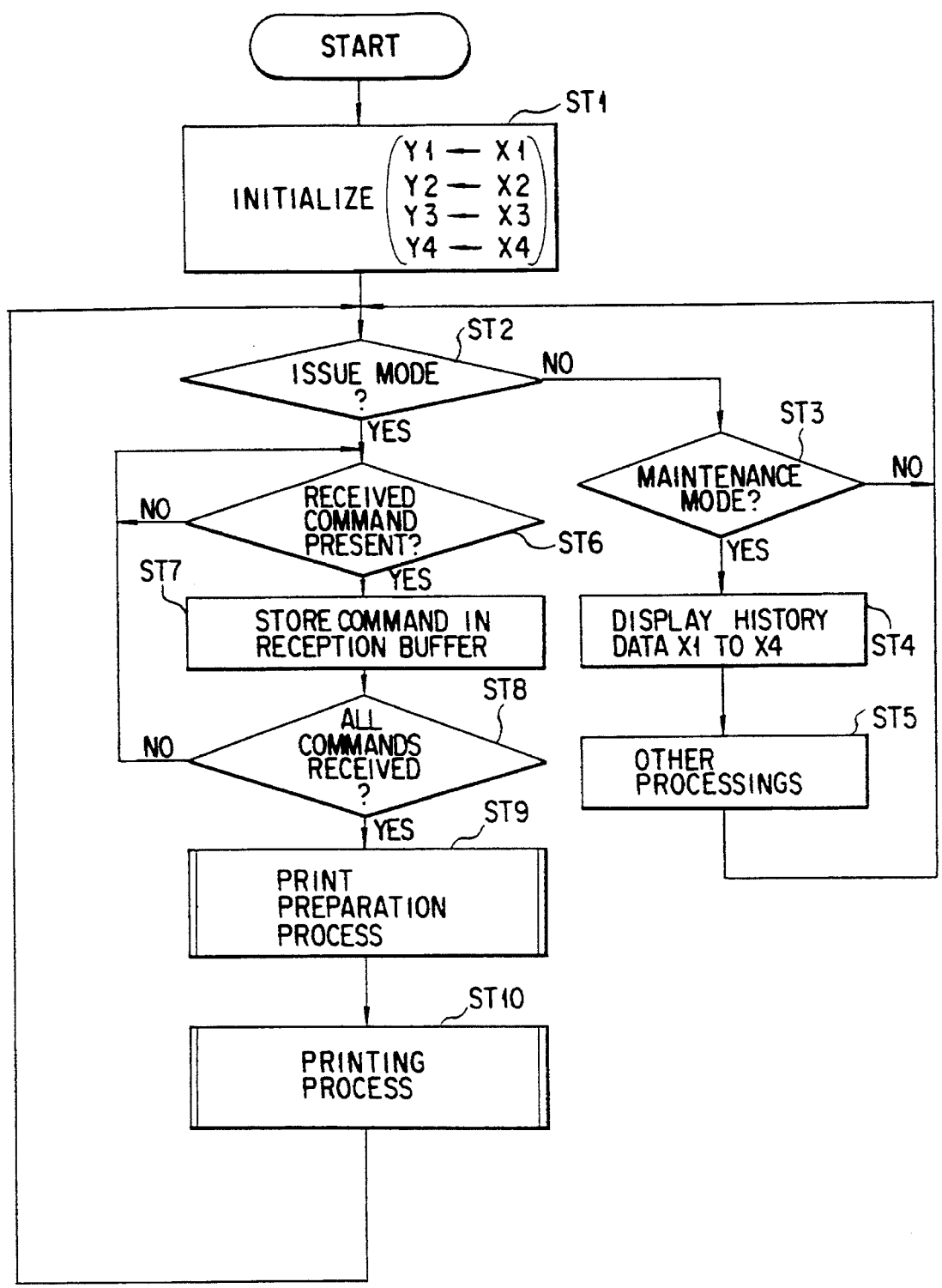
F I G. 7

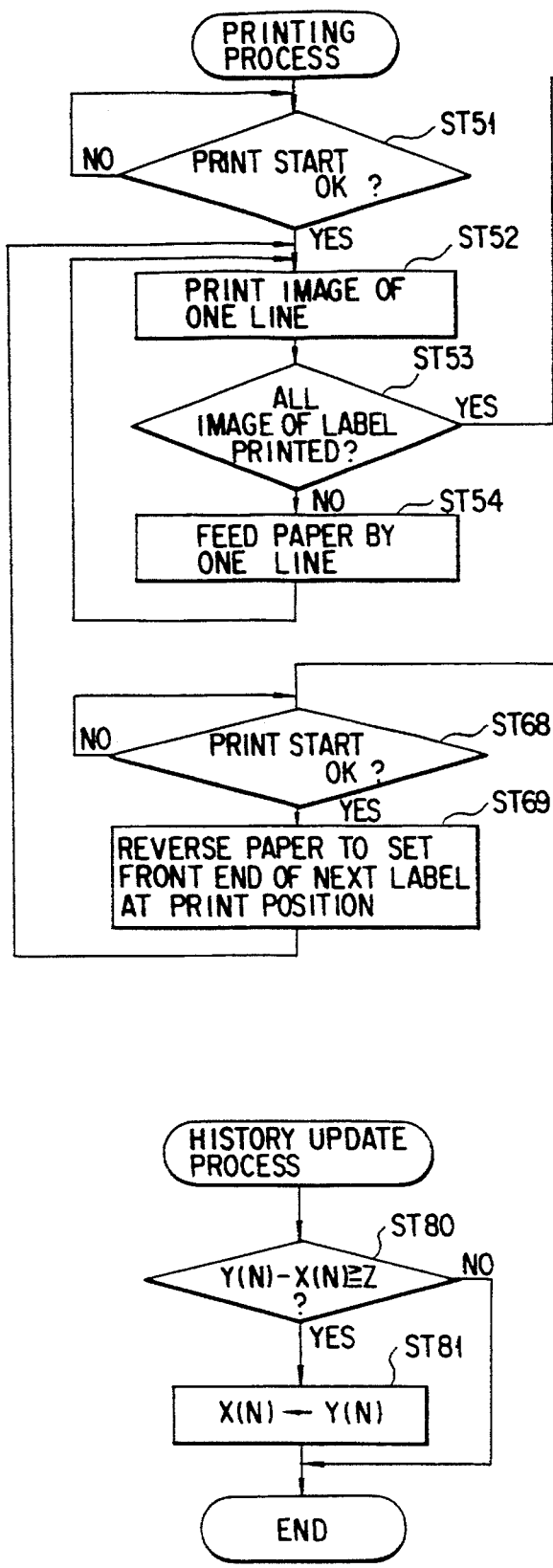
F I G. 10
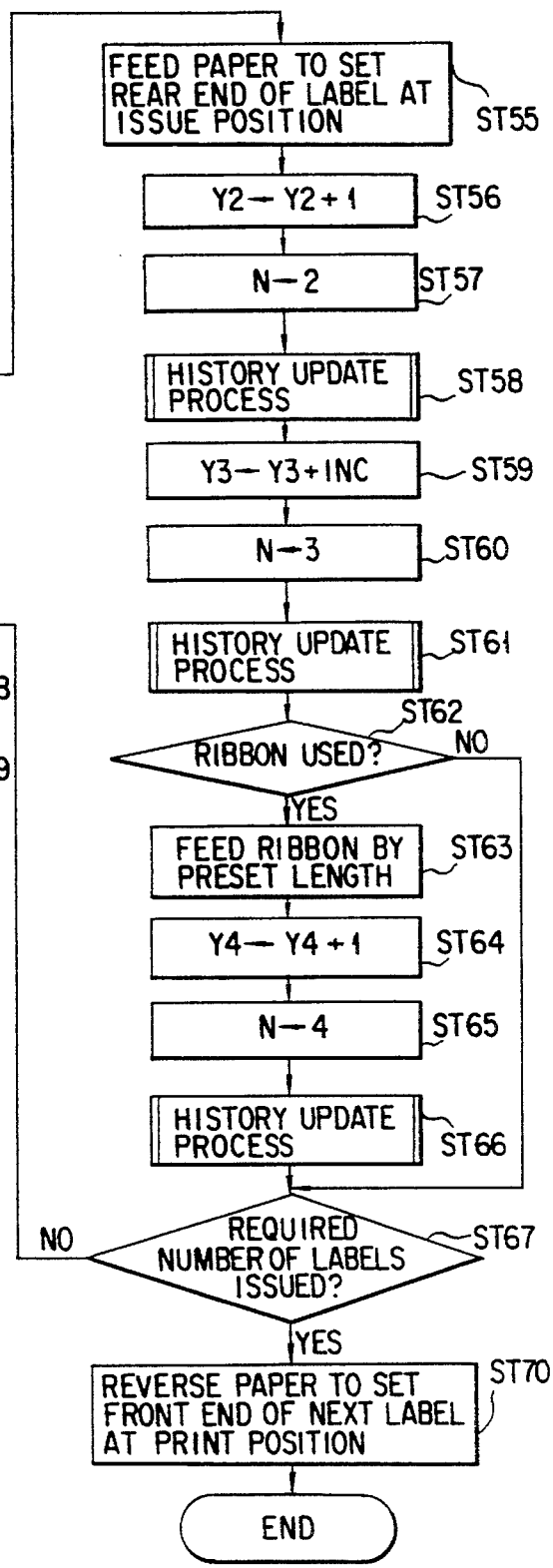
F I G. 9

HISTORY RECORDING APPARATUS

BACKGROUND OF THE INVENTION

1. Field of the Invention

The present invention relates to a history recording apparatus which is incorporated in an electronic apparatus so as to record the operation history data referred to during maintenance.

2. Description of the Related Art

In many large-scale retail shops, labels indicating the article information, such as article codes, names, prices, and the dates of manufacture or production, are attached to the commodities on sale. Labels of this kind are prepared by means of a label printer. The label printer prints article information supplied from a host computer on a roll of label paper and feeds the printed portions of the label paper to a label outlet. In large-scale retail shops, a label printer has to be maintained regularly so as to remove disorders which may adversely affect an operation of repeatedly issuing a large number of labels. The maintenance person replaces the printer parts wasted by the repeated issuance of labels with new ones.

A label printer recently developed employs a static RAM having an area which stores operation history data regarding predetermined operations, such as paper feeding, the driving of motors, and the processing of communication errors. Each time these operations are performed, the operation history data stored in the static RAM are updated. The static RAM is backed up by means of a battery, and retains the operation history data even when the label printer is OFF. The history data can be displayed on a display or printed on label paper under the control of a keyboard, and are used for inspection and repair of the printer. The maintenance person refers to the displayed or printed history data to determine which parts of the printer are wasted or disordered.

If it turns out that a disorder occurs somewhere in the circuit board on which the static RAM is provided, the circuit board is replaced with a spare circuit board so as to prevent completion of the repair from being delayed. As a measure for retaining the operation history data after the replacement, it is thought to display the operation history data on the display and store them in the static RAM provided on the spare circuit board. However, depending upon the kind of the disorder of the circuit board, the operation history data cannot be always displayed on the display. Even if they can be displayed on the display, it is not possible to determine whether the displayed data are correct.

For this reason, the label printer mentioned above is not allowed to retain the operation history data after the replacement of the circuit board. It should be also noted that the operation history data in the static RAM may be lost when the battery voltage falls; in other words, the label printer has problems in that the substantial data storage period is dependent on the charging capacity of the battery.

SUMMARY OF THE INVENTION

Accordingly, an object of the present invention is to provide a history recording apparatus capable of retaining operation history data regarding a predetermined operation of an electronic apparatus for a long period of time.

This object is attained by a history recording apparatus comprising: a nonvolatile memory for storing operation history data regarding a predetermined operation of an electronic apparatus; a connector provided on a circuit board of the electronic apparatus and detachably connectable to the nonvolatile memory; and a controller for updating the operation history data stored in the nonvolatile memory connected to the connector, upon detection of the predetermined operation having been performed a preset number of times which is determined on the basis of a writing (or programming) tolerance limit of the nonvolatile memory.

In the history recording apparatus, when the circuit board becomes out of order and must be replaced with new one, the nonvolatile memory can be first disconnected from the connector of the circuit board and then connected to the connector of the new circuit board. Since a nonvolatile memory is a memory capable of retaining data without external energy supplied thereto, the operation history data which has been stored in the nonvolatile memory is not lost during the replacement and can be utilized unless the nonvolatile memory itself fails to operate normally. In addition, the operation history data is not updated before the predetermined operation has been performed the preset number of times which is determined on the basis of the writing tolerance limit of the nonvolatile memory. Hence, the life of the nonvolatile memory can be lengthened eventually.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 7 is a flowchart for illustrating the operation of the label printer shown in FIG. 3;

FIG. 9 is a flowchart for illustrating the details of the printing process shown in FIG. 7;

FIG. 10 is a flowchart for illustrating the details of the history update process shown in FIGS. 8 and 9;

DETAILED DESCRIPTION OF THE PREFERRED EMBODIMENT

The label printer according to one embodiment of the present invention will now be described with reference to the accompanying drawings.

This printer performs printing on at least two types of label paper. The first one has a series of label regions whose ends are indicated by marks previously printed on the back surface thereof. The second one has a series of label regions formed of label seals pasted on a base sheet.

Figure 1:
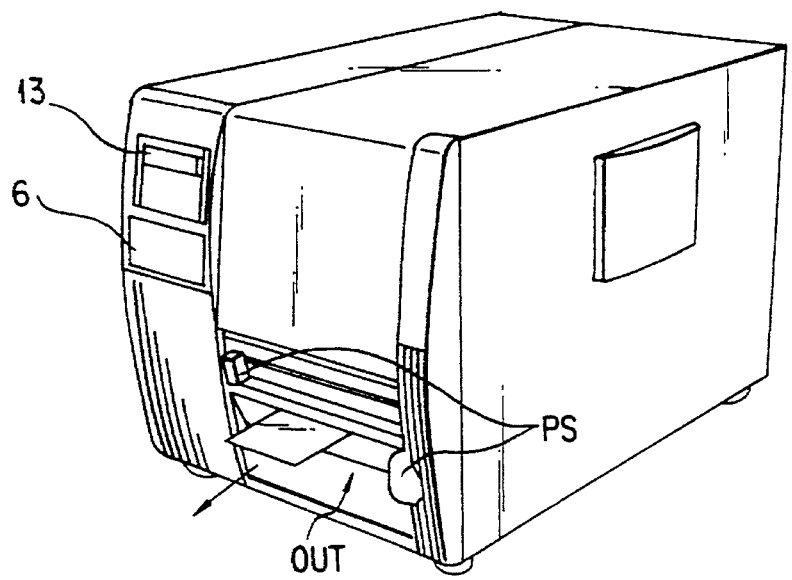
FIG. 1 is a view showing the appearance of a label printer according to one embodiment of the present invention.
Figure 2:
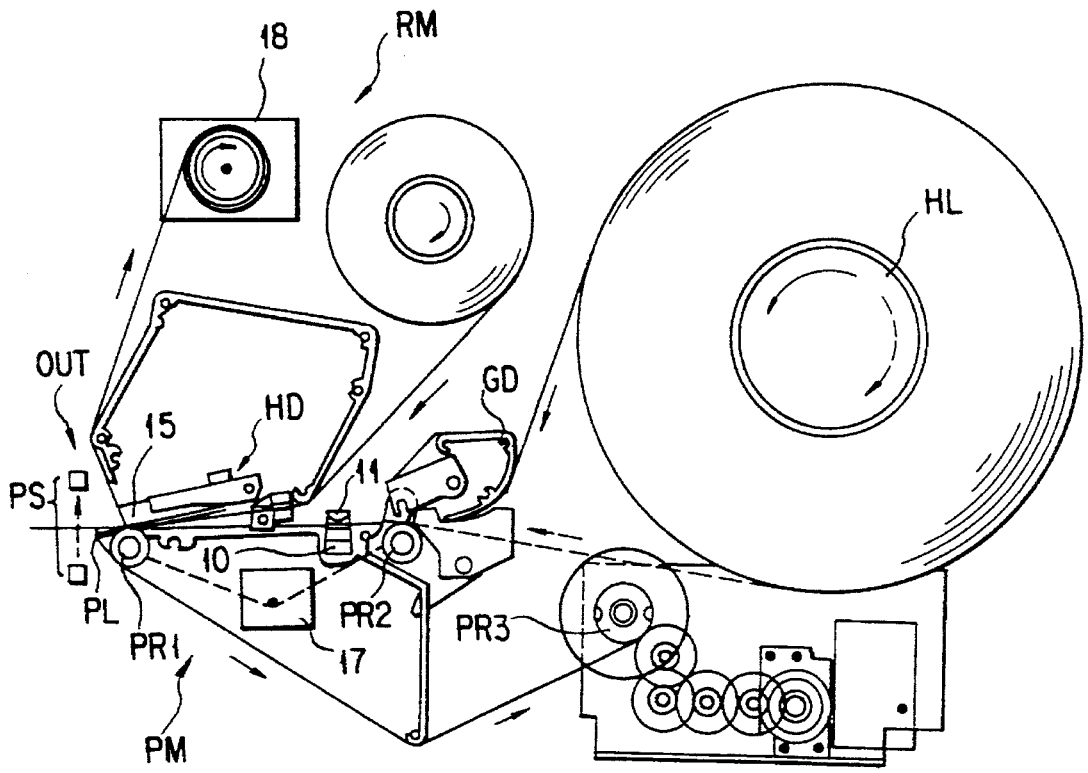
FIG. 2 is a view showing the internal arrangement of the label printer shown in FIG. 1.

FIG. 1 shows the appearance of the label printer, and FIG. 2 shows the internal arrangement of the label printer. This printer includes a paper holder HL, a paper guide GD, a printing head section HD, a platen roller PR1, a feed roller PR2, a peel-off roller PR3, a peel-off plate PL, and peel-off sensor PS. The paper holder HL holds label paper rotatably set thereon. The front end of the label paper is pulled from the paper holder HL to a label outlet OUT. The paper is urged against the platen roller PR1 from the side of the printing head section HD. The platen roller PR1 repeatedly feeds the continuous paper by a preset length or distance while the printing head section HD performs printing on a label region 1 of the label paper, and further feeds the paper to set the front end of the next label region to the printing position. In the case where the label paper has a base sheet, this base sheet is supplied to the peel-off roller PR3 after passing the peel-off plate PL. Each label seal is peeled off from the base sheet at the peel-off plate PL as the rollers PR1, PR2, and PR3 rotate, and supplied to the label outlet OUT.

Figure 3:
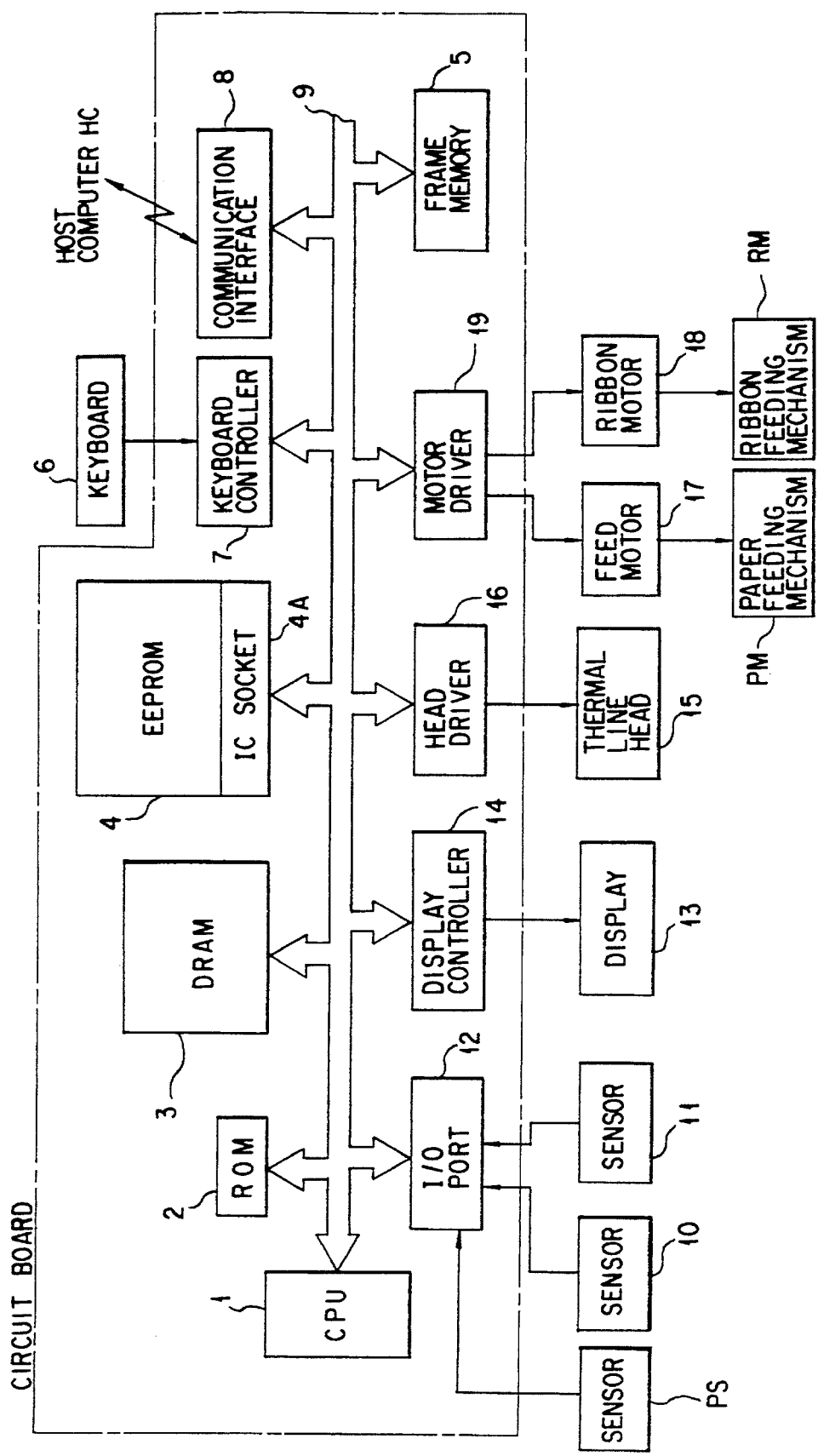
FIG. 3 is a block diagram showing the circuit of the label printer shown in FIG. 1.

As shown in FIG. 3, the label printer includes the following: a CPU 1, a ROM 2, a dynamic RAM (DRAM) 3, an electrically erasable and programmable ROM (EEPROM) 4, an IC socket 4A, a frame memory 5, a keyboard 6, a keyboard controller 7, a communication interface 8, a system bus 9, a reflection sensor 10, a transmission sensor 11, an input/output port 12, a display 13, a display controller 14, a thermal line head 15, a head driver 16, a feed motor 17, a ribbon motor 18, a motor driver 19, a paper feeding mechanism PM, and a ribbon feeding mechanism RM. On a single circuit board, CPU 1 is connected through the system bus 9 to the following: ROM 2, DRAM 3, EEPROM 4, frame memory 5, keyboard controller 7, communication interface 8, input/output port 12, display controller 14, head driver 16, and motor driver 19 by way of the system bus 9. EEPROM 4 is detachably coupled the IC socket 5, fixed to the circuit board, and is electrically connected through the IC socket 5 to the system bus 9. The keyboard 6 is connected to the keyboard controller 7. The reflection sensor 10, the transmission sensor 11, and the peel-off sensor PS are connected to the input/output port 12. The display 13 is connected to the display controller 14. The thermal line head 15 is provided on a tip portion of the printing head section HD and connected to the head driver 16. The feed motor 17 and the ribbon motor 18 are formed of a stepping motor and connected to the motor driver 19.

CPU 1 performs a control process for controlling the entire operations of the label printer. The control program for CPU 1 and fixed data are stored in ROM 2. ROM 2 has an area storing patterns of a variety of characters (including numerals) and patterns of bar codes as the fixed data, and constituting a pattern generator which generates patterns in accordance with the print data included in a label data command. DRAM 3 temporarily stores input and output data of CPU 1. The frame memory 5 stores, as a print pattern, a combination of the patterns generated by the pattern generator. In the frame memory 5, the storage area of the print pattern is determined in accordance with the label size. A host computer HC supplies various control commands regarding label printing to the label printer. These control commands are first received by the communication interface 8 and then supplied to CPU 1. The keyboard 6 has a variety of control keys, such as a print start key and a paper feed key, and further has a mode selection switch and a power switch. The keyboard interface 7 supplies CPU 1 with key input signals corresponding to the key operations on the keyboard 6. The feed motor 17 and the ribbon motor 18 is selectively driven by the motor driver 19. The motor driver 19 rotates a selected motor by one step at intervals controlled by the CPU 1. The CPU 1 enables the rotation of the selected motor by one step each time an interrupt signal is produced from an internal timer therein. The paper feeding mechanism PM feeds label paper in the forward or backward direction in accordance with the rotation of the feed motor 17. The ribbon feeding mechanism RM feeds the ink ribbon in one direction in accordance with the rotation of the ribbon motor 18. The thermal line head 15 faces an unused portion of the ink ribbon each time the ribbon feeding mechanism RM feeds the ink ribbon. The head driver 16 drives the thermal line head 15 in units of one line in accordance with the print pattern stored in the frame memory 5, causing a label to be printed on the label paper. The display controller 14 controls the display 13 to display the state of the label printer, the print data, etc. The reflection sensor 10 is a reflection-type optical sensor for sensing a mark printed on the label paper. The transmission sensor 11 is a transmission-type optical sensor for sensing a gap between each adjacent pair of label seals. A sensing signal from sensor 10 or 11 is supplied through the input/output port 12 to CPU 1, so that CPU 1 can confirm the position of the label paper. The peel-off sensor PS senses a label seal supplied to the label outlet OUT to inhibit start of printing on the next label seal until the label seal is picked up.

Figures 4, 5:
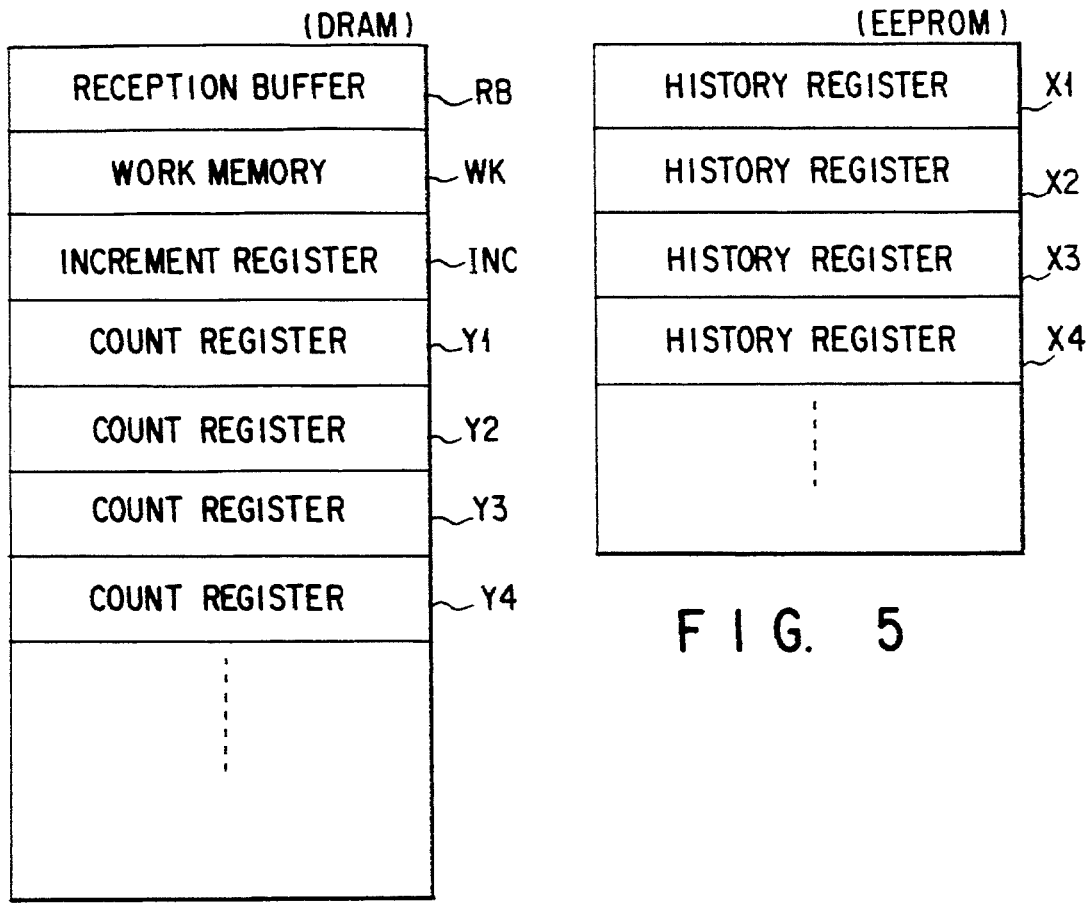
FIG. 4 is a memory map of the DRAM depicted in FIG. 3.
FIG. 5 is a memory map of the EEPROM depicted in FIG. 3.
Figure 6:
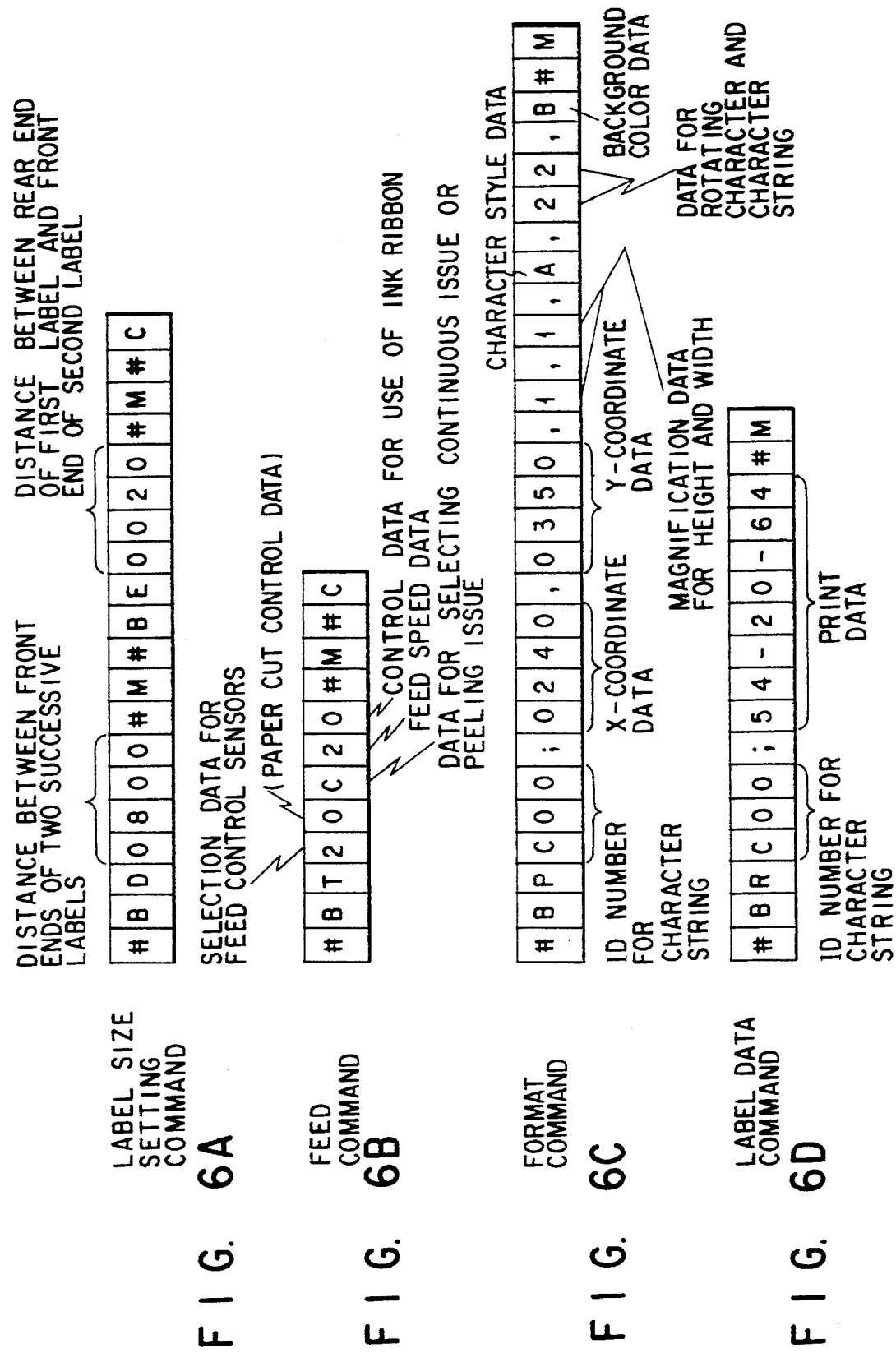
FIGS. 6A through 6D show the contents of control commands which are supplied from a host computer to the label printer shown in FIG. 3.

As is shown in FIG. 4, DRAM 3 includes areas constituting a reception buffer RB, a work memory WK, an increment register INC, and count registers Y1–Y4. The reception buffer RB temporarily stores various control commands supplied from the host computer HC. The work memory WK stores various kinds of data set in the print preparation process. The increment register INC stores increment data indicating a distance of paper feed for each label to be issued. This unit distance is determined according to the size of a label to be printed, assuming that the distance has a value of "1" for a minimum-sized label, for example. The count register Y1 stores count data indicating the total number of times an communication error occurs. The count register Y2 stores count data indicating the total number of times the feed motor 17 is driven (i.e., the total number of labels issued). The count register Y3 stores count data indicating the total distance of paper feed. The count register Y4 stores count data indicating the total number of times the ribbon motor 18 is driven.

As is shown in FIG. 5, EEPROM 4 includes area constituting history registers X1–X4. These registers X1–X4 store data which are updated by the contents of the count registers Y1–Y4, respectively. To be specific, the register X1 stores history data indicating the total number of times a communication error occurs, the register X2 stores history data indicating the total number of times the feed motor 17 is driven, the register X3 stores history data indicating the total distance of paper feed, and the register X4 stores history data indicating the total number of times the ribbon motor 18 is driven. The history data in each of the history registers X1–X4 is updated until the count in the corresponding count register reaches predetermined value Z. Generally, EEPROM 4 has writing tolerance limit of 100,000 times, in which writing errors would not easily occur.

The host computer HC transmits various control commands to the label printer. As is shown in FIGS. 6A–6D, examples of the control commands transmitted by the host computer HC are a label size setting command, a feed command, a format command, and a label data command. The label size setting command includes data on the distance between the front ends of two successive labels, and data on the distance between the rear end of the first label and the front end of the second label. The feed command includes selection data used for selecting one of the sensors 10 and 11, and control data used for controlling the use of the ink ribbon. The format command includes two-dimensional coordinate data, magnification data, character style data, data used for rotating a character and a character string, and background color data. The label data command includes codes of characters (numerals) which are printed as article information in the form of a character string or in the form of a bar code. The format command is prepared for a corresponding label data command.

The label printer operates as described below.

When the label printer is turned on, CPU 1 executes the control program to perform the operation shown in FIG. 7. Upon start of this process, the communication interface 8, DRAM 3, the frame memory 5, etc. are initialized in step ST1. During this initialization, the contents in the history registers X1–X4 of EEPROM 4 are read out and stored in count registers Y1–Y4 of DRAM 3, respectively. In steps ST2 and ST3, a check is made to see whether the issue mode or the maintenance mode is selected by means of the mode switch of the keyboard 6. When it is determined in step ST3 that the maintenance mode is selected, the contents in history registers X1–X4 (the contents will be hereinafter referred to as history data X1–X4) are read out from EEPROM 4 and displayed on the display 13 in step ST4, and other processings are performed in step ST5. Thereafter, CPU 1 executes step ST2 again. The other processings include a processing of storing report data which are entered from the keyboard 6 and pertain parts replacement or repair, in a free area of EEPROM 4, a processing of displaying the report data on the display 13 upon request from the keyboard 6, a processing of feeding newly-set label paper to a printing position under the control of the paper feed key.

When, in step ST2, the issue mode is determined as being selected, step ST6 is executed to check whether or not a control command received from the host computer HC is present. The command received from the host computer HC is stored in the reception buffer RB in step ST7. In step ST8, a check is made to see whether or not all control commands that are required for the issuance of labels have been received. If there is a command which have not yet been received, step ST6 is executed again.

When it is determined in step ST8 that all commands required for the issuance of labels have been received, CPU 1 first performs a print preparation process in step ST9 and then performs a printing process in step ST10. After a required number of labels are printed and issued, CPU 1 executes step ST2 again.

Figure 8:
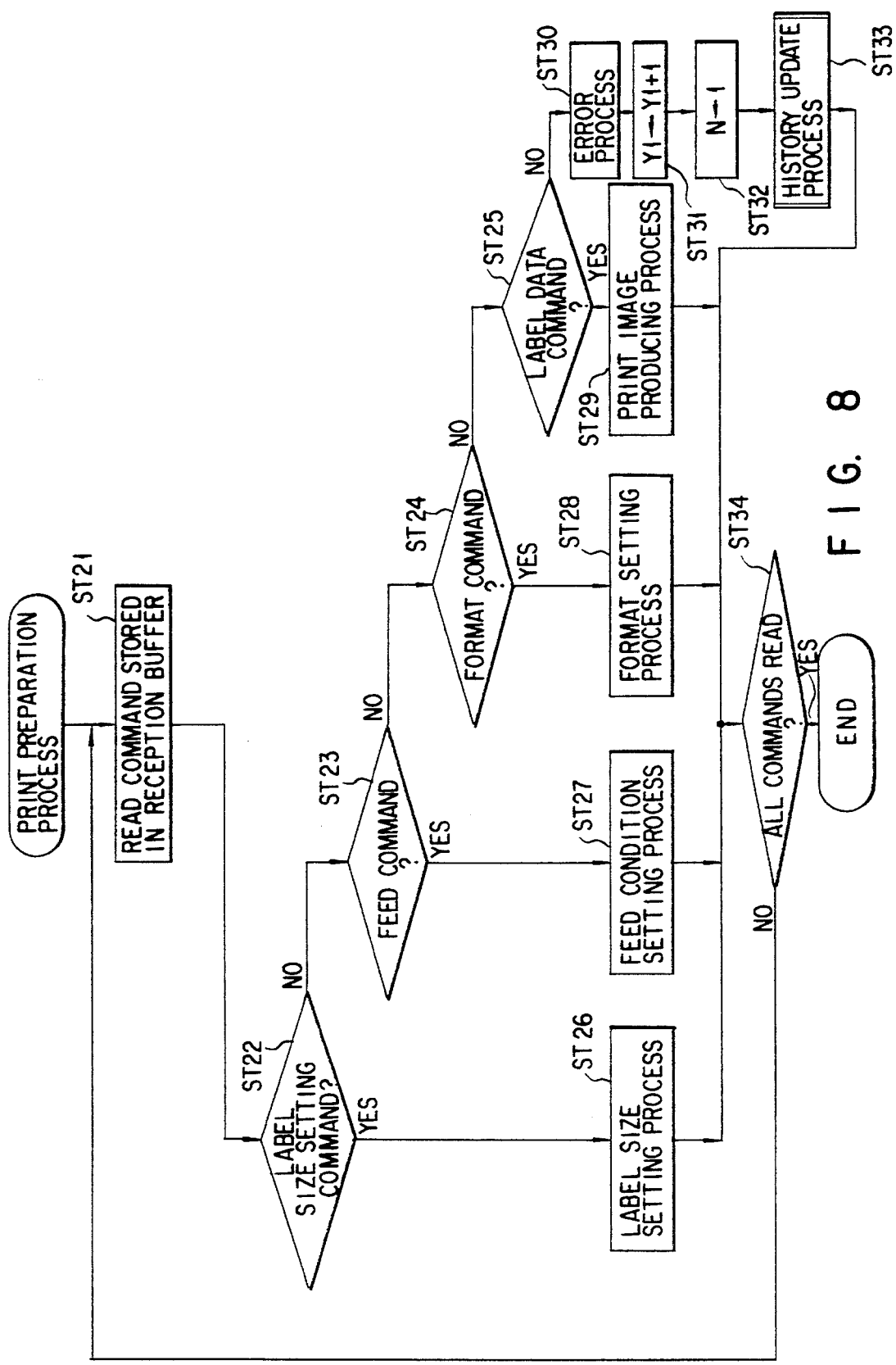
FIG. 8 is a flowchart for illustrating the details of the print preparation process shown in FIG. 7.

FIG. 8 shows the details of the print preparation process mentioned above.

Upon start of the print preparation process, CPU 1 reads out in step ST21 one of the commands which are stored in the reception buffer RB, and checks in steps ST22–25 whether the readout command is a label size setting command, a feed command, a format command, or a label data command. If the command read out from the reception buffer RB is determined as a label size setting command in step ST22, CPU 1 performs a label size setting process in step ST26. In this process, a distance of paper feed for each label is determined in accordance with the label size data, and is stored in the increment register INC as increment data of a unit distance by which the total distance of paper feed is incremented. In addition, an area for storing the print pattern is set in the frame memory 5 in accordance with the label size data. If the command read out from the reception buffer RB is determined as a feed command in step ST23, CPU 1 performs a feed condition setting process in step ST27. In this process, selection data for selecting one of the sensors 10 and 11 and control data for controlling the use of the ink ribbon are stored in the work memory WK. If the command read out from the reception buffer RB is determined as a format command in step ST24, CPU 1 performs a format setting process in step ST28. In this process, two-dimensional coordinate data, magnification data, character style data, data for rotating a character and a character string, background color data, etc. are stored in the work memory WK. If the command read out from the reception buffer RB is determined as a label data command in step ST25, CPU 1 performs a print image producing process in step ST29. In this process, the pattern generator converts codes of characters (numerals) into either a character string or a pattern in the form of a bar code, and each pattern data obtained by this conversion is stored in the frame memory 8.

If the command read out from the reception buffer RB is not one of the four commands mentioned above (namely, the label size setting command, the feed command, the format command, and the label data command), CPU 1 performs an error process in step ST30. Thereafter, in step ST31, CPU 1 adds "1" to the content of count register Y1, which counts the number of times a reception error occurs. (The content of count register Y1 will be hereinafter referred to simply as "count Y1".) Subsequently, in step ST32, register designation data N is set to have a value of "1", thereby designating count register Y1 and history register X1. After execution of these two steps, CPU 1 performs a history update process in step ST33.

Step ST34 is executed after the execution of one of steps ST26, ST27, ST28, ST29 and ST33. When it is determined in step ST34 that all of the received commands have been read out from the reception buffer RB, the print preparation process is brought to an end. If there is a command which has not yet been read out from the reception buffer RB, step ST21 is executed again.

FIG. 9 shows the details of the printing process mentioned above.

Upon start of the printing process, step ST51 is repeatedly executed to check whether print start is permitted or not. When the print start is permitted, the print pattern for one line is read out from the frame memory 5 and printed on a label paper as an image in step ST52. In step ST53, a check is made to see whether all image of a label has been printed. If part of the label image remains unprinted, the label paper is fed by one line in step ST54, and steps ST52 and ST53 are executed again. After steps ST52–ST54 are repeated, step ST55 is executed when it is confirmed in step ST53 that all label image has been printed.

In step ST55, the label paper is fed such that the rear end of the label is set at the issue position, i.e., at the label issuance port, thereby permitting the label to be issued.

After the label issuance, CPU 1 adds "1" to the content of count register Y2 in step ST56, which register counts the number of times the feed motor 17 is driven (the content of count register Y2 will be hereinafter referred to simply as "count Y2"). Subsequently, in step ST57, the register designation data N is set to have a value of "2", thereby designating count register Y2 and history register X2. After execution of steps ST56 and ST57, CPU 1 performs the history update process in step ST58.

In step ST59, CPU 1 adds the content of the increment register INC (the content of the increment register INC will be hereinafter referred to simply as "increment INC") to the count of count register Y3, which counts the total distance of paper feed (the content of count register Y3 will be hereinafter referred to simply as "count Y3"). Subsequently, in step ST60, the register designation data N is set to have a value of "3", thereby designating count register Y3 and history register X3. After execution of steps ST59 and ST60, CPU 1 performs the history update process in step ST61.

In step ST62, a check is made to see whether the ink ribbon has been used. If it is determined that the ink ribbon has been used, the ink ribbon is fed by a preset distance in step ST63.

In step ST64, CPU 1 adds "1" to the content of count register Y4, which counts the number of times the ribbon motor 18 is driven (the content of count register Y4 will be hereinafter referred to simply as "count Y4"). Subsequently, in step ST65, the register designation data N is set to have a value of "4", thereby designating count register Y4 and history register X4. After execution of steps ST64 and ST65, CPU 1 performs the history update process in step ST66.

Step ST67 is executed after it is determined in step ST62 that the ink ribbon has not been used and after the history update process is performed in step ST66. In step ST67, a check is made to see whether a required number of labels have been issued or not. Unless it is determined in step ST67 that all required labels have been issued, step ST68 is repeatedly executed to check whether print start is permitted or not when the print start is permitted, step ST69 is executed to reverse the label paper until the front end of the next label is set at the printing position. Thereafter, step ST52 is executed again.

When it is determined in step ST67 that all required labels have been issued, step ST70 is executed to reverse the label paper until the front end of the next label is set at the printing position. After the execution of step ST70, the printing process is brought to an end.

FIG. 10 shows the details of the history update process performed in the print preparation process and printing process mentioned above.

Upon start of the history update process, CPU 1 reads out count Y(N) and history data X(N) from a count register of DRAM 3 and a history register of EEPROM 4 which are designated by the register designation data N. A difference between the readout count Y(N) and history data X(N) is compared with a predetermined value Z in step ST80 to detect whether the difference is less than the predetermined value Z. To be more specific, count Y1 and history data X1 are read out in the history update process of step ST33, count Y2 and history data X2 are read out in the history update process of step ST58, count Y3 and history data X3 are read out in the history update process of step ST61, and count Y4 and history data X4 are read out in the history update process of step ST66.

If the count Y(N) has reached the value obtained by adding the predetermined value Z to the history data X(N), the history data X(N) are overwritten and replaced with the count Y(N) in step ST81. If the count Y(N) has not reached that value, the history update process is brought to an end, without step ST81 being executed.

According to the embodiment mentioned above, where the circuit board fails to normally function, due to some trouble, and is replaced with a spare circuit board, EEPROM 4 is disconnected from the IC socket 4A of the circuit board that fails to normally function. By connecting EEPROM 4 to the IC socket of the spare circuit board, the history data that have been updated can be retained. Furthermore, EEPROM 4 stores history data X1–X4 regarding the predetermined operations of the label printer, and these data are transferred to DRAM 3 as counts Y1–Y4 when the label printer is turned on. The counts Y1–Y4 are increased or updated each time the predetermined operations are performed, and history data X1–X4 are rewritten to become identical to counts Y1–Y4 each time the total of the increments has reached the value Z predetermined according to the writing tolerance limit of EEPROM 4. Therefore, it takes a long period of time before the total number of writing operations has reaches the tolerance limit of EEPROM 4.

If the operator forgets to turn off the label printer, counts Y1–Y4 may be lost when the main switch of the power supply panel is turned off after the shop is closed. However, as mentioned above, counts Y1–Y4 are written in EEPROM 4 when each of counts Y1–Y4 has been increased by the predetermined value Z. This avoids the history data X1–X4 from being deviated greatly from the actual number of times the predetermined operations are performed.

In the embodiment mentioned above, CPU 1 is used to rewrite the operation history data in EEPROM 4 upon detecting the number of times the predetermined operations are performed. However, a circuit which fulfills this function in cooperation with either a mechanical sensor or an optical sensor may be provided on the circuit board, independently of CPU 1.

Further, the operation history data retained in the EEPROM 4 can be printed on the label paper in the maintenance mode.

Figure 11:
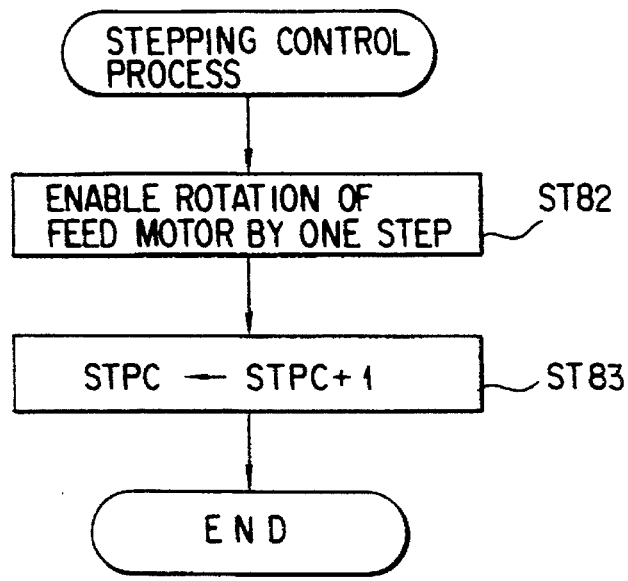
FIG. 11 is a flowchart for illustrating a stepping control process.
Figure 12:
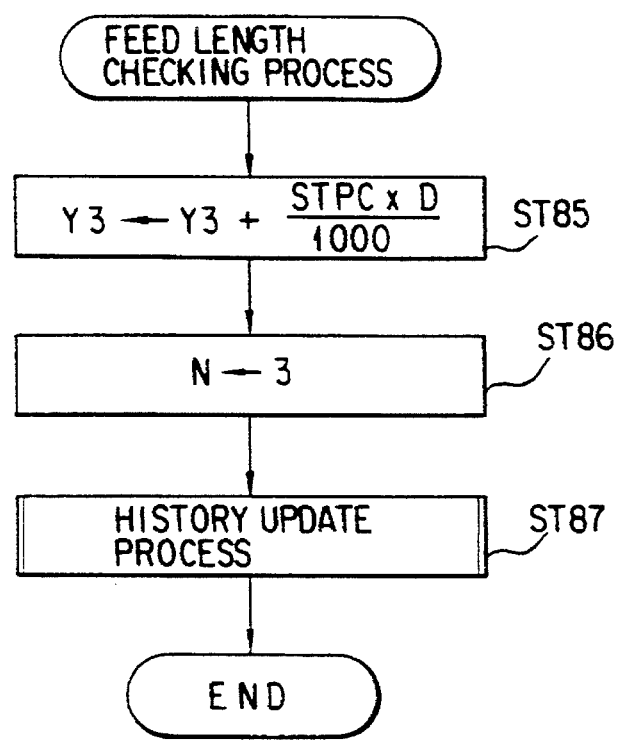
FIG. 12 is a flow chart for illustrating a feed length checking process.

Moreover, the printing process of FIG. 9 can be modified in order to update the history data X3 (i.e., the total distance of paper feed) by means of a stepping control process shown in FIG. 11 and a feed length checking process shown in FIG. 12. In this case, steps ST59–ST61 are deleted.

The stepping control process is performed when an interrupt signal is produced from the internal timer in steps ST54, ST55, ST69, and ST70. When the stepping control process is started, CPU 1 enables rotation of the feed motor 17 by one step in step 82, and step count data STPC is added by "1" in step ST83. The stepping control process terminates after step ST83 is executed. In addition, the step count data STPC is stored in DRAM 4, and cleared to "0" at the time when the printing process is started.

The feed length checking process is performed after step ST70. When this process is started, CPU 1 adds, in step ST85, a value of (D×STPC)/1000 to the count of count register Y3. (where D denotes the paper feed length for one step rotation of the feed motor 17) Subsequently, in step ST86, the register designation data N is set to have a value of "3", thereby designating count register Y3 and history register X3. Thereafter, CPU 1 performs the history update process in step ST87.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A history recording apparatus, comprising:

a nonvolatile memory for storing operation history data regarding a predetermined operation of an electronic apparatus, the storing of operation history data which predetermined operation is repeated at variable intervals;

a socket mounted on a circuit board of said electronic apparatus, for holding said nonvolatile memory such that said nonvolatile memory is detachably connected to said socket; and control means for updating the operation history data stored in said nonvolatile memory connected to said socket, upon detection of the predetermined operation having been performed a preset number of times which is determined on the basis of a writing tolerance limit of said nonvolatile memory.

2. A history recording apparatus according to claim 1, wherein said control means includes:

a volatile memory for storing count data representing a number of times the predetermined operation is performed; and processing means for incrementing the count data stored in the volatile memory upon detection of performance of the predetermined operation, and for updating the operation history data stored in the nonvolatile memory each time the count data has been incremented by said preset number.

3. A history recording apparatus according to claim 2, wherein said processing means includes means for transferring the operation history data from said nonvolatile memory to said volatile memory as said count data when the electronic apparatus is turned on and for obtaining a difference between the count data stored in the volatile memory and the operation history data stored in the nonvolatile memory.

4. A history recording apparatus according to claim 2, wherein said nonvolatile memory comprises an EEPROM, and said volatile memory comprises a DRAM.

5. A history recording apparatus according to claim 1, wherein said predetermined operation comprise a process which is performed by a control processor incorporated in said electronic apparatus.

6. A history recording apparatus according to claim 2, wherein said processing means includes a control processor incorporated in said electronic apparatus.

7. A printer apparatus comprising:

printing means for printing a variety of images on paper; and control means for controlling the printing means;

said control means including:

a nonvolatile memory for storing operation history data regarding a predetermined operation which predetermined operation is repeated at variable intervals;

a socket mounted on a circuit board of said control means for holding said nonvolatile memory such that said nonvolatile memory is detachably connected to said socket; and processing means for updating the operation history data stored in said nonvolatile memory connected to said socket, upon detection of the predetermined operation having been performed a preset number of times which is determined on the basis of a writing tolerance limit of said nonvolatile memory.

* * * * *

UNITED STATES PATENT AND TRADEMARK OFFICE
CERTIFICATE OF CORRECTION

PATENT NO. : 5,479,467
DATED : December 26, 1995
INVENTOR(S) : Katsumata

It is certified that error appears in the above-indentified patent and that said Letters Patent is hereby corrected as shown below:

Title page, Item [73] Assignee, "Tec," should be --TEC,--

Signed and Sealed this

Second Day of July, 1996

Attest:

BRUCE LEHMAN

Attesting Officer

Commissioner of Patents and Trademarks